United States Patent [19]
Gabrielian et al.

[11] Patent Number: 5,936,704
[45] Date of Patent: Aug. 10, 1999

[54] MARKED CONTACT LENS BEARING OPTICAL MARKING ELEMENT

[76] Inventors: Grant Gabrielian, 301 Deguire Blvd., Apt. 1147, St. Laurent, PQ, Canada, H4N 108; Robert Marie, 1371 Pine Avenue West, Montreal, Quebec, Canada, H3G 1B2

[21] Appl. No.: 08/995,366

[22] Filed: Dec. 22, 1997

[51] Int. Cl.$^6$ .................................................. G02C 7/04
[52] U.S. Cl. ........................................................ 351/160 R
[58] Field of Search ............................... 351/160 R, 161, 351/162, 160 H, 177, 219

[56] References Cited

U.S. PATENT DOCUMENTS

| | | |
|---|---|---|
| 4,194,814 | 3/1980 | Fischer et al. . |
| 4,525,044 | 6/1985 | Bauman .............................. 351/160 H |
| 5,062,701 | 11/1991 | Drazba et al. ...................... 351/160 R |
| 5,467,149 | 11/1995 | Morrison et al. . |
| 5,641,437 | 6/1997 | Williams et al. . |

*Primary Examiner*—George Manuel
*Attorney, Agent, or Firm*—Swabey Ogilvy Renault

[57] ABSTRACT

The marked contact lens has at least one microlens optical marking element integrally formed on the surface of the contact lens in a peripheral area thereof. The microlens marking elements are of shallow depth, yet focus light to appear as relatively bright (or dark) marking objects. The marking elements may be spherical or cylindrical microlens formations. The dimensions of the microlenses are chosen so as to avoid any irritation when worn by the user. The marking objects identify the lens source, proper orientation or, in the case of soft lenses, inversion.

20 Claims, 4 Drawing Sheets

MARKED CONTACT LENS BEARING OPTICAL MARKING ELEMENT

FIELD OF THE INVENTION

The present invention relates to a marked lens, and more particularly to a marked contact lens and a method of making same.

BACKGROUND OF THE INVENTION

During the past 10 to 15 years, contact lenses have tended to replace glasses for correcting vision problems. These days, an entire industry exists for contact lens manufacturing and retailing.

One of the problems associated with contact lenses is marking the lens in order to allow the users to wear them properly, in the right position. Some lenses have to be worn in an "upright" orientation while soft lenses must be worn without inverting them, i.e. wearing them inside-out. Generally, identification and orientation marks applies to all kinds of contact lenses.

Various methods of contact lens identification are known in the prior art. One method is printing a visible mark on the periphery of the lens. However, this method is not suited for wet molded soft lenses since the printing must be performed on a dry surface and the lenses are never in a dry state. Furthermore, the dark mark printed on lenses may be too visible, so observers may even see the mark when the lens is worn by a person.

Another method is to engrave or impart a mark on a lens producing an opaque surface. However, this surface is necessarily rough and may be felt by the wearer, thus producing discomfort. The engraved mark may also attract and retain proteinaceous and other types of deposits creating propitious conditions for an infection.

Another method of marking contact lenses is to mark them using a laser. However, this method can not be employed for wet molded soft contact lenses. It is also time-consuming and expensive.

SUMMARY OF THE INVENTION

It is therefore a broad object of the present invention to provide a method of marking transparent and semi-transparent thin surfaces by providing optical means by way of varying the form of such surfaces on small areas.

It is a more specific object of the present invention to provide a method of marking contact lenses using a number of optical elements.

It is also an object of the invention to provide a marked contact lens with markings appearing to be bright or dark (depending on the focal length of the optical element and the distance at which the lens is held by the viewer) when viewing a light source through the lens.

According to the invention, it is an object of the present invention to provide an identification, orientation or inversion marking method for contact lenses using at least one optical element.

In a broad aspect of the present invention, the identification method using optical elements is not restricted to lenses. Even if the invention is applicable to all kinds of lenses, including dry or wet lenses as well as soft or rigid lenses, the present method may also be used for marking any other kind of transparent or semi-transparent material that needs to be marked.

For clarity, this text uses the term "surface orientation" to designate the orientation of a lens with its concave surface toward the wearer's eye, as it should be worn. The main object of the present invention is to provide an easy information to the lens user concerning the right surface orientation of the lens, before the lens is applied on the eye's surface.

Inversion identification is applicable to soft lenses, where the concave side is frequently inverted outwardly into a convex shape in which state the lens is not suitable to be worn. However, such a state of the lens is not clearly visible to the observer and often times people may incorrectly wear their lenses.

According to the invention, instead of marking contact lenses as in the prior art by adding a color on them such as by printing or engraving a mark on them, the present invention uses microstructure surface variations, such as dot or cylindrical microlenses, having the form of concave or convex semi-spheres or semi-cylinders (the cross-section may also be elliptical or aspheric), which are applied on the surface of the contact lens in order to provide identification and orientation marks for allowing the user to wear the lenses in the adequate position. The surface variations are small and their surface is smooth and highly polished therefore these microlenses do not attract and do not retain proteinaceous and other deposits. Furthermore, these microlenses are not felt by the wearer's eyelid. The dimensions of the microlenses are chosen so as to avoid any irritation when worn by the user. However, when removed and held up toward a light source, they permit to the user to clearly see them, thus providing information on the right position they have to be worn in.

In a preferred embodiment of the present invention, such optical elements are used to form letters or other distinctive signs at specific locations on the contact lens surface and these letters or signs provide position information to the user.

In another preferred embodiment of the invention, the optical elements may be located on a single side of the lenses or on both sides of the lenses. In the latter case, the optical elements may be even smaller in depth or height if they are applied in conjunction to one another, one on each face of the lens, thus superposing the optical effect seen by the human eye when looking to the lens toward a light source.

According to the invention, there is provided a marked contact lens comprising at least one microlens optical marking element integrally formed on a surface of the contact lens in a peripheral area thereof.

The invention also provides a method of manufacturing a marked contact lens comprising the steps of: forming at least one microformation in a contact lens manufacturing mold for integrally forming a microlens optical marking element; and molding a lens in the mold to obtain the marked contact lens.

The invention further provides a marked lens comprising at least one microlens optical marking element integrally formed on a surface of the lens in a non-image forming area thereof.

BRIEF DESCRIPTION OF THE DRAWINGS

The invention will be better understood by reference to the accompanying drawings in which:

FIG. 1a is a front view of a sphero-cylindrical contact lens having orientation marks indicating the prism ballast on the lens for holding the lens in a particular position; FIG. 1b is a front view of a contact lens having printed or engraved marks; FIGS. 1c, 1d, 1e and 1f are a plan and a side view of a non-inverted and an inverted contact lens respectively having AL/JA inversion marks;

FIG. 3a shows a number of semi-spherical optical elements used for creating the two letters AL on the lens surface, while FIG. 3b shows semi-cylindrical elements used to form the same two letters on the lens surface.

DESCRIPTION OF THE PREFERRED EMBODIMENTS

In the preferred embodiment, optical elements are used to mark lenses. These marks are used to provide lens position information to the lens user, so lenses may be worn in the right position. FIG. 1 shows printed and engraved marks used in the prior art in order to provide position information to the lens wearer.

Figure 1A:
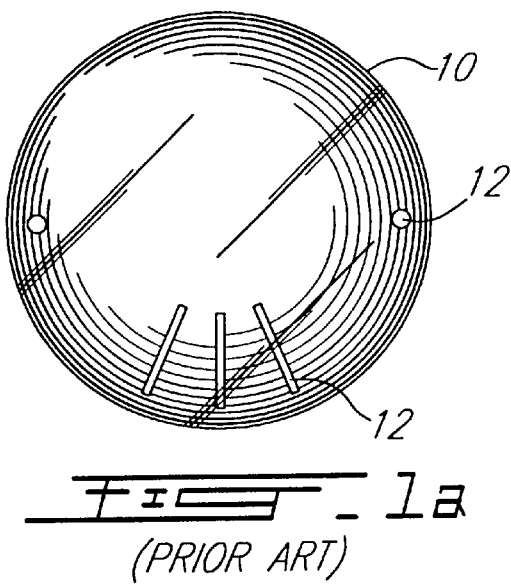
FIGS. 1a to 1f illustrate prior art techniques of marking contact lenses, specifically.
Figure 1B:
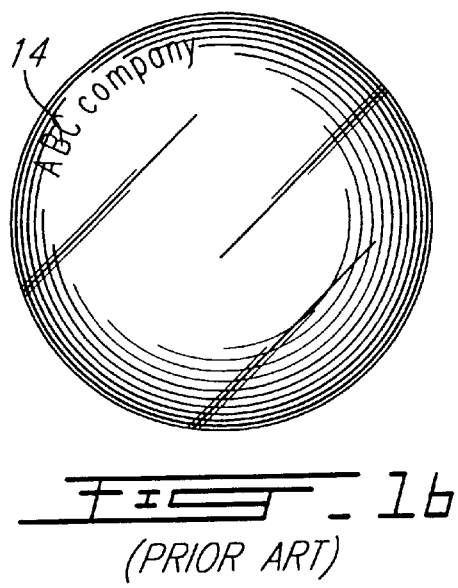
Figure 1C:
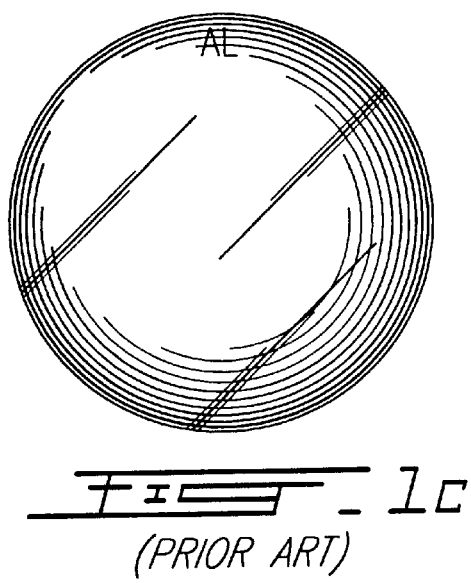
Figure 1D:
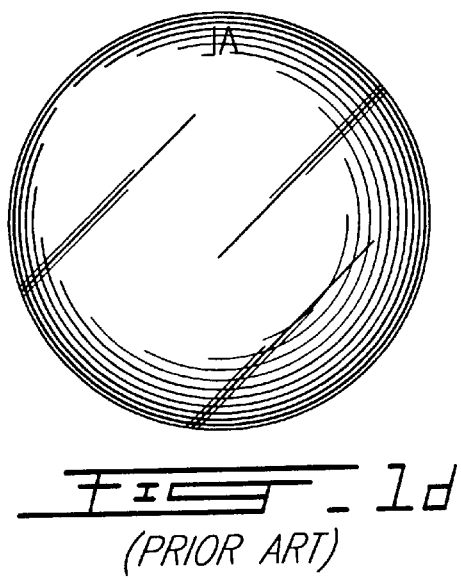
Figure 1E:
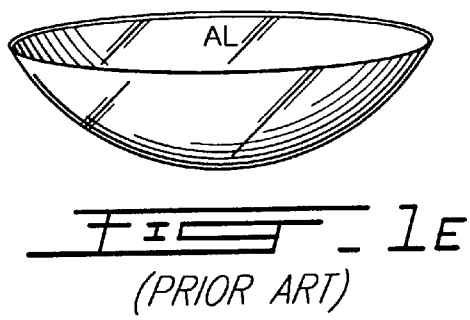
Figure 1F:
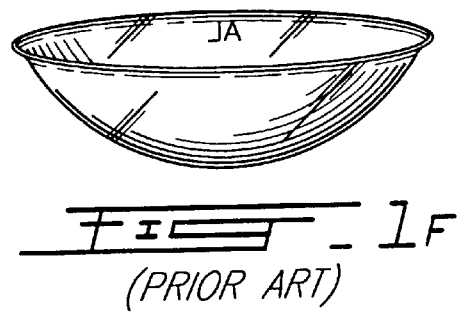
Figure 2:
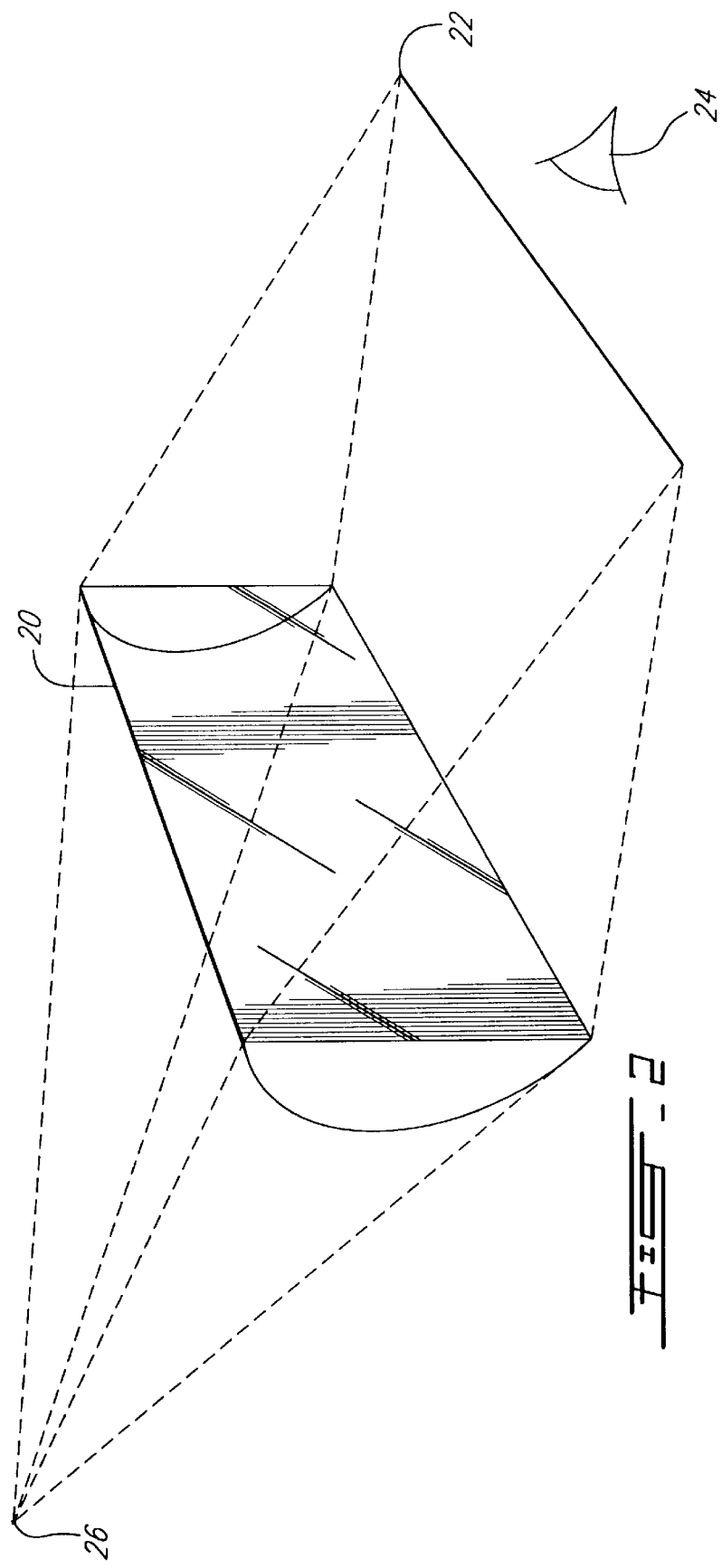
FIG. 2 respectively illustrates the prior art principal of a semi-cylindrical lens which forms a straight line image when a person looks through it at a light source.

According to the present invention, semi-spherical or semi-cylindrical optical elements are provided on the surface of the contact lens for providing lens position information to the lens user. An important characteristic of such marks is that they are not felt or seen by the wearer while the lenses are worn. They are, however, clearly visible when the lens is examined visually, especially when held toward a light source. As an example, a semi-cylindrical optical element 20 is shown in FIG. 2; the cylindrical element 20 is seen as a straight line 22 when a user 24 looks through it at a light source 26.

The optical marks on the contact lenses are composed by a plurality of microlens optical elements which are imparted on the surface of the contact lens. Each of these optical elements 20 acts as either a spherical lens 21 or a cylindrical lens 20 (or a combination of them) applied on the contact lens 10.

Figure 3A:
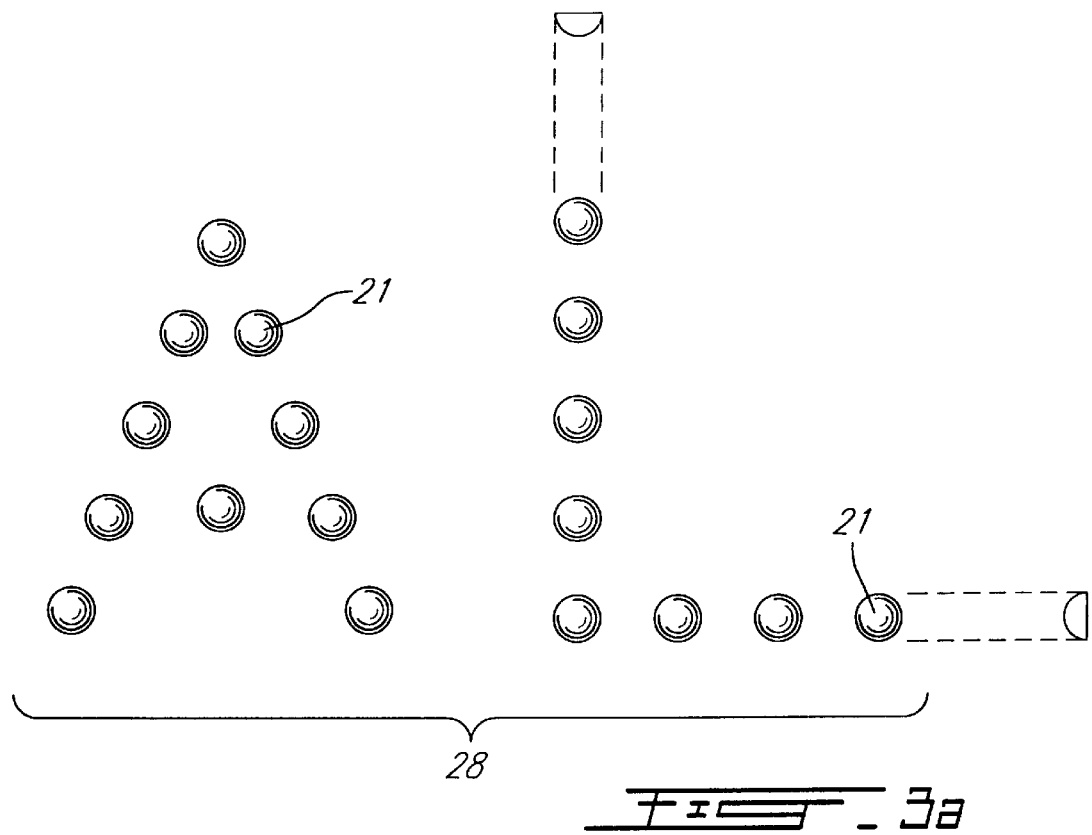
FIGS. 3a and 3b illustrate microlens optical elements which are used in the preferred embodiment to mark the contact lens, specifically.
Figure 3B:
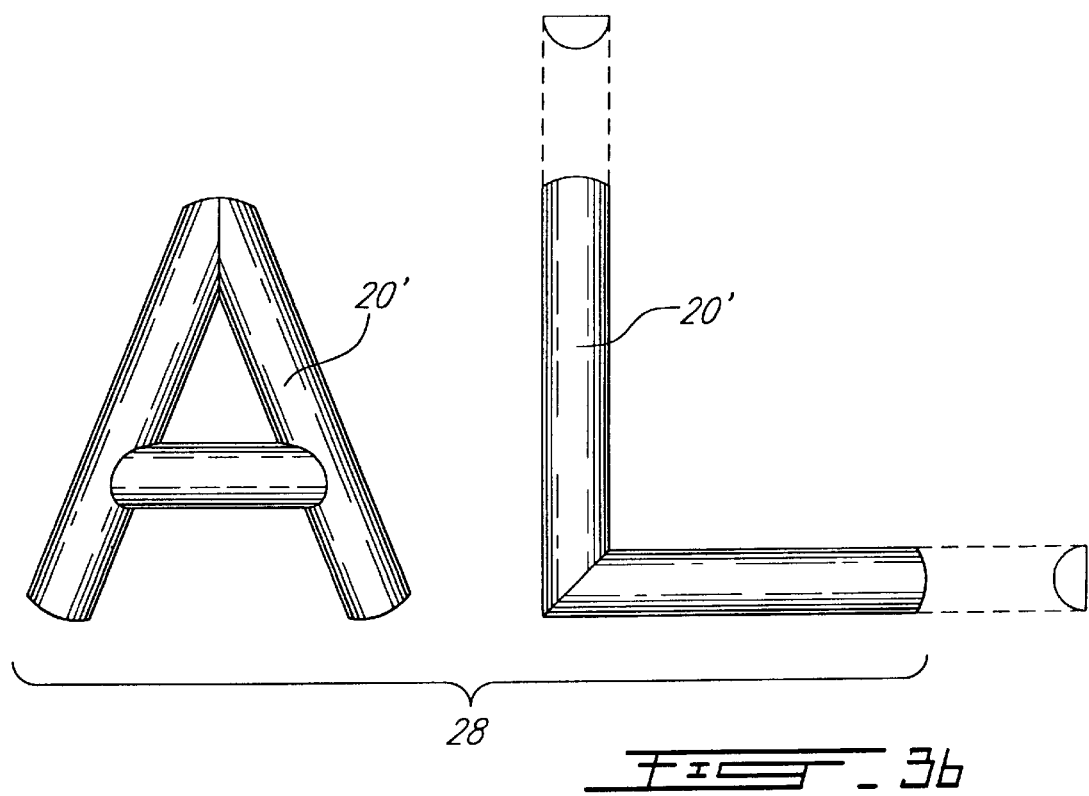

FIG. 3 illustrates some optical marks 28 having the form of two letters AL and which are composed of spherical elements 21 (FIG. 3a) and cylindrical elements 20' (FIG. 3b). In the case of a spherical element 21, the mark would appear to the viewer as a bright or dark point (depending on the focal length of the optical element and the distance at which the lens is held by the viewer) on the contact lens when the lens is held in front of a light source. In the case of a cylindrical element, the mark appears as a bright or dark line, as shown in FIG. 2.

In the preferred embodiment, the mark "AL" composed of cylindrical elements is provided on a contact lens. When a user examines such a contact lens 10, as the one shown in FIG. 4, in the right way, i.e. the concave surface 30 of the lens toward the eye, the user sees the letters "AL" and he knows this is the right orientation the lens is suppose to have. If the lens has its inside part 30 facing outwardly (i.e. it is inverted and its outer surface 32 is now toward the eye) then the user sees the letters "JA", as better shown in FIGS. 1d and 1f, and knows that this is the wrong orientation of the lens, so he may invert it before applying it onto the eye.

In the preferred embodiment of the present invention, the size of the optical marks are of the order of 2 mm in length and are located at the periphery of the contact lens. Other sizes of marks as well as other locations may be suitable as well, as long as they do not interfere with the wearer's vision and are not visible to others when worn by the wearer. The saggittal depth or the height of the optical elements 20 and 21 is preferably not more than 1.5 microns so the lens wearer can not feel them. The following table shows approximate dimensions of the optical elements in the preferred embodiments. These dimensions are provided as an example only and are not limited to the values provided.

TABLE

| Saggittal Height/Depth of the Optical Elements | | | |
|---|---|---|---|
| Dioptric Pow- | Width of Sphero-Cylindrical Elements | | |
| er of Element | W = 0.20 mm | W = 0.30 mm | W = 0.40 mm |
| +/− 5.00 D | H/D = 0.00061 mm | H/D = 0.00138 mm | H/D = 0.00245 mm |
| +/− 10.00 D | H/D = 0.00067 mm | H/D = 0.00151 mm | H/D = 0.00268 mm |
| +/− 15.00 D | H/D = 0.00073 mm | H/D = 0.00164 mm | H/D = 0.00292 mm |

Figure 4B:
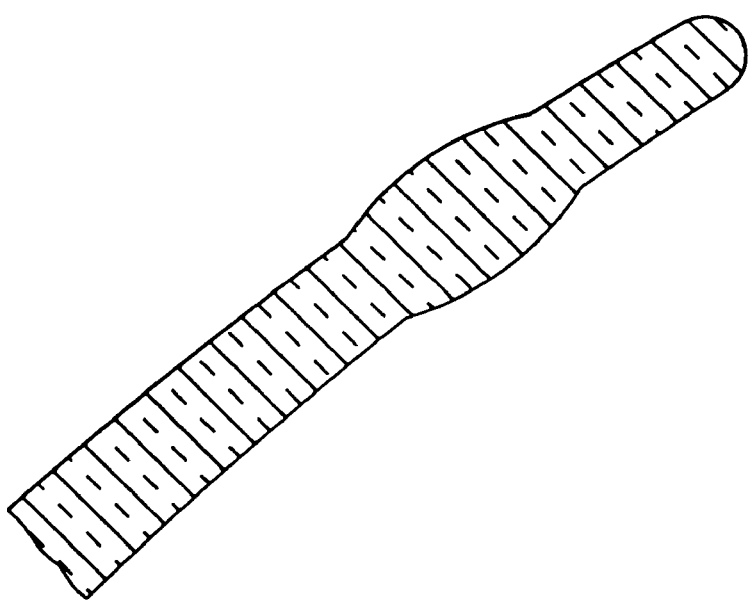
FIG. 4 is a partial sectional view of the contact lens according to the preferred embodiment of the present invention wherein dual optical elements are used to create an optical mark on both lens surfaces.
Figure 4A:
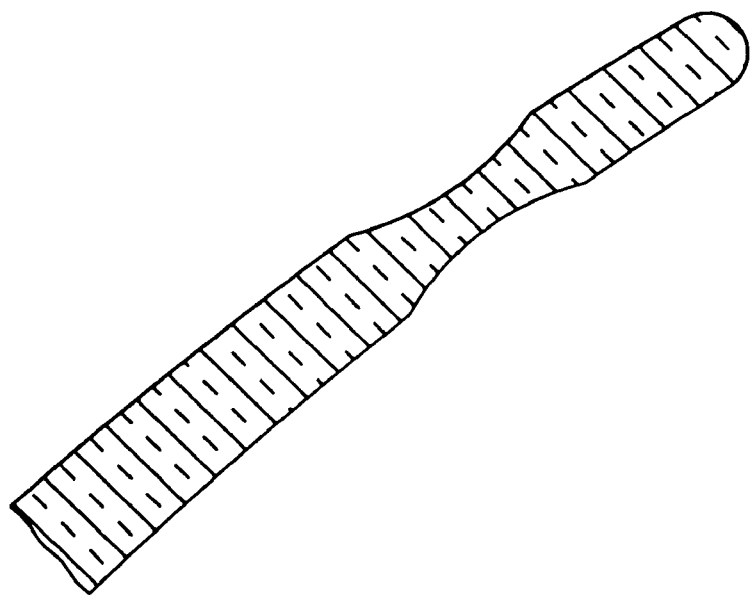

In another preferred embodiment of the present invention, the depth or height of optical elements 20 and 21 are substantially reduced even further if the elements are applied in conjunction with one another, one on each side of the contact lens, as shown in FIG. 4. Concave or convex elements of smaller depth or height may be used for generating an optical mark having the same visibility as a mark of greater height or depth applied on a single side of a lens.

All optical elements disclosed in the present application have a smooth surface and have no abrupt sides so the surface transition from the optical element to the contact lens is smooth and does not comprise any edges irritating to the user's eyelid. This feature is an improvement over the prior art because it does not retain impurities, it is not felt by the wearer, and it is not visible for an observer when worn on the eye, while remaining clearly visible when removed and examined visually by the user.

In a preferred embodiment of the present invention, the method of imparting the optical elements 20 and 21 onto the contact lens 10 for creating optical marks 28 is to incorporate the mark 28 into the optical molds used to mold the contact lenses so that no other step is added to the lens manufacturing process. The molds may be micro-machined or precision etched to achieve the precise desired shape of the microlens optical marking elements.

We claim:

1. A marked contact lens comprising at least one microlens optical marking element integrally formed on a surface of said contact lens in a peripheral area thereof.

2. The contact lens as claimed in claim 1, wherein said at least one microlens optical marking element makes a smooth transition with said contact lens surface.

3. The contact lens as claimed in claim 1, wherein said at least one microlens optical marking element is a concave depression in said surface.

4. The contact lens as claimed in claim 1, wherein said at least one microlens optical marking element is a cylinder having a circular cross-section.

5. The contact lens as claimed in claim 1, wherein said at least one microlens optical marking element is spherical.

6. The contact lens as claimed in claim 1, wherein said at least one microlens optical marking element is a cylinder having an aspheric cross-section.

7. The contact lens as claimed in claim 1, wherein said at least one microlens optical marking element is an aspheroid.

8. The contact lens as claimed in claim 1, wherein said contact lens is a soft contact lens, and said at least one marking element provides an inversion marking.

9. The contact lens as claimed in claim 1, wherein said at least one microlens optical marking element is integrally molded with said contact lens.

10. The contact lens as claimed in claim 1, wherein two said microlens optical marking elements are provided, one on each side of said contact lens in registration with each other so as to enhance an optical marking seen through both of said two microlens optical marking elements.

11. The contact lens as claimed in claim 1, wherein said at least one microlens optical marking element is a convex depression in said surface.

12. The contact lens as claimed in claim 1, wherein said at least one microlens optical marking element forms at least one letter or symbol.

13. The contact lens as claimed in claim 1, wherein said at least one microlens optical marking element forms at least one letter or symbol and is composed of at least one cylinder having a substantially circular cross-section.

14. A method of manufacturing a marked contact lens comprising the steps of:

forming at least one microformation in a contact lens manufacturing mold for integrally forming a microlens optical marking element; and molding a lens in said mold to obtain said marked contact lens.

15. The method as claimed in claim 14, wherein said microformation is shaped such that said at least one microlens optical marking element makes a smooth transition with said contact lens surface.

16. The contact lens as claimed in claim 14, wherein said microformation is convex such that said at least one microlens optical marking element obtained is a concave depression in said surface.

17. The contact lens as claimed in claim 14, wherein said microformation is a cylinder having a substantially circular cross-section such that said at least one microlens optical marking element obtained is a cylinder having a substantially circular cross-section.

18. The contact lens as claimed in claim 14, wherein said microformation is substantially spherical such that said at least one microlens optical marking element is substantially spherical.

19. The contact lens as claimed in claim 14, wherein two said microformations are provided, one on each side of said mold in registration with each other, such that two said microlens optical marking elements are provided, one on each side of said contact lens in registration with each other, so as to enhance an optical marking seen through both of said two microlens optical marking elements.

20. A marked lens comprising at least one microlens optical marking element integrally formed on a surface of said lens in a non-image forming area thereof.

* * * * *

UNITED STATES PATENT AND TRADEMARK OFFICE
CERTIFICATE OF CORRECTION

PATENT NO. : 5,936,704
DATED : August 10, 1999
INVENTOR(S) : Grant GABRIELIAN et al It is certified that error appears in the above-identified patent and that said Letters Patent is hereby corrected as shown below:

Col. 1, line 36, change "can not" to --cannot--;
Col. 2, line 10, change "often times" to --oftentimes--;
Col. 3, line 59, change "suppose" to --supposed-;
Col. 4, line 7, change "can not" to --cannot--;
Col. 6, line 5, change "contact lens" to --method--;
Col. 6, line 9, change "contact lens" to --method--;
Col. 6, line 14, change "contact lens" to --method--;
Col. 6, line 18, change "contact lens" to --method--.

Signed and Sealed this

Twenty-eighth Day of December, 1999

Attest:

Q. TODD DICKINSON

*Attesting Officer*  Acting Commissioner of Patents and Trademarks